United States Patent [19]
Adler, Jr. et al.

[11] 3,781,861
[45] Dec. 25, 1973

[54] ALARM LOCK

[76] Inventors: Charles F. Adler, Jr., 3153 N. Hudson Ave., Chicago, Ill. 60657; Marshall L. Silver, 814 Michigan Ave., Evanston, Ill. 60202

[22] Filed: Apr. 4, 1972

[21] Appl. No.: 241,005

[52] U.S. Cl.............. 340/280, 340/63, 340/256, 70/233, 116/33
[51] Int. Cl. ............................................ G08b 21/00
[58] Field of Search................. 340/280, 256, 283, 340/63; 116/33, 6, 8, 77; 70/233

[56] References Cited
UNITED STATES PATENTS

| 1,747,194 | 2/1930 | Thomas | 340/280 X |
|---|---|---|---|
| 3,444,547 | 5/1969 | Surek | 340/256 X |
| 3,553,674 | 1/1971 | Head | 340/280 |
| 597,891 | 1/1898 | Walstrom | 340/63 |

Primary Examiner—John W. Caldwell
Assistant Examiner—William M. Wannisky
Attorney—E. Manning Giles et al.

[57] ABSTRACT

An alarm and locking device is provided wherein a housing containing an electrical alarm circuit is constructed for attachment to the body of an easily movable object, such as a bicycle. An object restraining and switch activating component is provided to enable the movable object to be connected to a fixed object when the component is locked into position with the housing. Any cutting or interruption of the connection made by the object restraining and switch activating component operates a switch in the electrical alarm circuit thereby allowing current to pass to and activate a warning signal. Once the warning signal is activated rejoining the severed connection of the object restraining and switch activating component will not deactivate it.

6 Claims, 7 Drawing Figures

PATENTED DEC 25 1973

ALARM LOCK

BACKGROUND AND SUMMARY OF THE INVENTION

This invention relates to an alarm and locking device which is used to protect items that can be moved or carried away by a thief. The alarm lock of the present invention is particularly suited to be used in connection with bicycles and motorcycles and provides an effective deterrent against misappropriation of these vehicles. Positive theft protection is provided both by a sturdy locking mechanism for securing the movable object to a stationary object, such as, a bicycle rack, tree or telephone pole, and by an electric alarm system which generates a loud warning upon the unauthorized interruption or severing of the connection made by the locking mechanism. The locking alarm device of the present invention is also useful in protecting trailers, barbeque grills, outdoor furniture, gates and other easily movable personal property.

In recent years, there has been a revival of bicycle riding among adults. The bicycle is no longer considered solely a child's form of transportation. This is particularly true in urban areas where cycling has been adopted both as a pleasant form of exercise and as an alternative to the automobile, bus or subway for short distance transportation. However, the continuing problems resulting from this bicycle usage are the possibility and the ease of theft of the bicycle-type vehicle.

Devices, presently, generally available for protecting such vehicles are flexible cables or chains which are slipped through the spokes of a wheel, around a stationary object, and then locked to form a closed loop around the bicycle and the stationary object. Certain of these devices contain a lock as an integral part of the unit, while others rely on the use of a separate padlock. The degree of protection provided by these available locking devices depends upon the strength of the cable and lock. However, no chain or cable is strong Enough to discourage a thief equipped with professional bolt-cutting equipment. After a thief disengages these locking devices, he can easily slip away with the vehicle without directing any attention to his activities.

The prior art also includes various alarm systems, which react to movement of the vehicle and are set off by such movement as the thief moves the vehicle from its desired location. Of course, these alarms operate only after the thief is on his way and, therefore, provide less protection than a device that sounds its warning before movement of the vehicle occurs. Furthermore, these mechanical alarm devices are believed to be relatively easy to subvert and would provide little positive discouragement to the would-be thief.

In accordance with the present invention, an alarm lock is provided which combines the features of the sturdiest available locking devices with an integrally related electrical alarm system that is detonated prior to the movement or actual appropriation of the vehicle. In addition, the alarm lock is constructed so as to be very difficult to disable, and because substantial time, effort and equipment is required to do so; the system, therefore, provides its owner with an added anti-theft advantage over those not owning such alarm systems.

The alarm lock system disclosed in the present invention provides an electrical alarm circuit contained in a housing of sturdy construction which is to be attached to the frame of the bicycle or the body of any fairly large movable object. The alarm circuit includes a warning device which is normally isolated from the circuit by a switch of either electronic or mechanical operation. An object restraining and switch activating component, for example, a flexible armor metal cable sheathing a switch activating mechanism within, is slipped through the spokes of a wheel around a stationary object, and then locked in with the housing to complete the locking and alarm system. Once the system is activated, cutting or otherwise disengaging the object restraining component in order to free the vehicle for movement and appropriation, will detonate the alarm and set off a loud warning signal. the warning signal will direct the public's attention to the activities of the thief and, thereby, provide positive theft protection for the vehicle. Extra protection is built into the system by providing a switch that will remain conductive even is the cut ends of the object restraining and switch activating component are rejoined.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification and in which like numerals are employed to designate like parts throughout the same.

DETAILED DESCRIPTION OF THE PREFERRED EMBODIMENT

Figure 1:
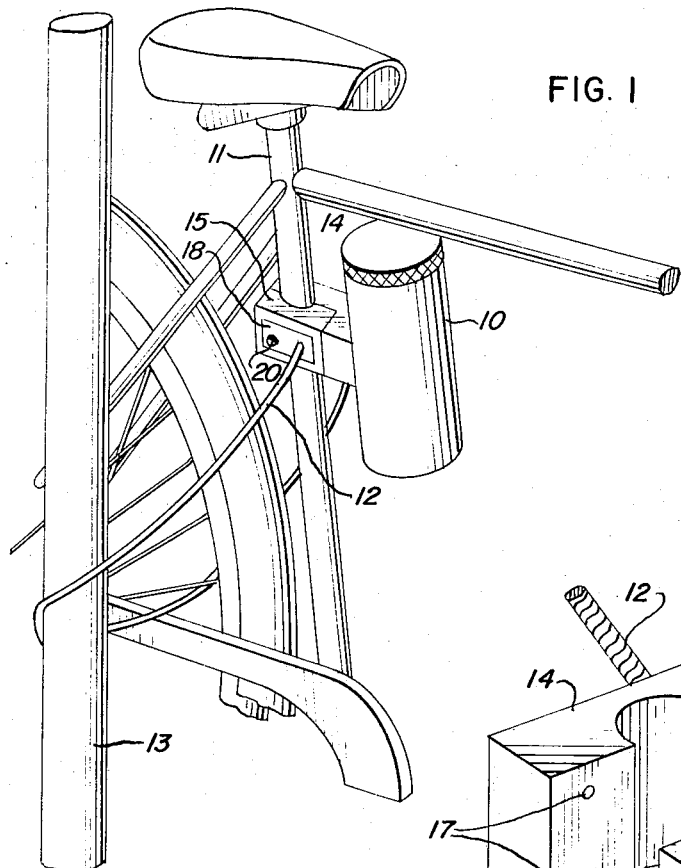
FIG. 1 shows the alarm lock of the present invention as attached to a bicycle and connected between the bicycle and a stationary object.

In the system shown generally in FIG. 1, an alarm case housing 10, preferably constructed out of heavy duty force-resistant aluminum, or steel or other high strength force-resistant material, such as, fiberglass reinforced or other high strength plastic, is shown attached to a bicycle frame 11. A flexible armor metal cable 12 is shown slipped through the rear wheel of the vehicle 11, around a stationary object 13, and locked into the housing 10 forming a fixed locking loop between the vehicle and the stationary object 13.

Figure 2:
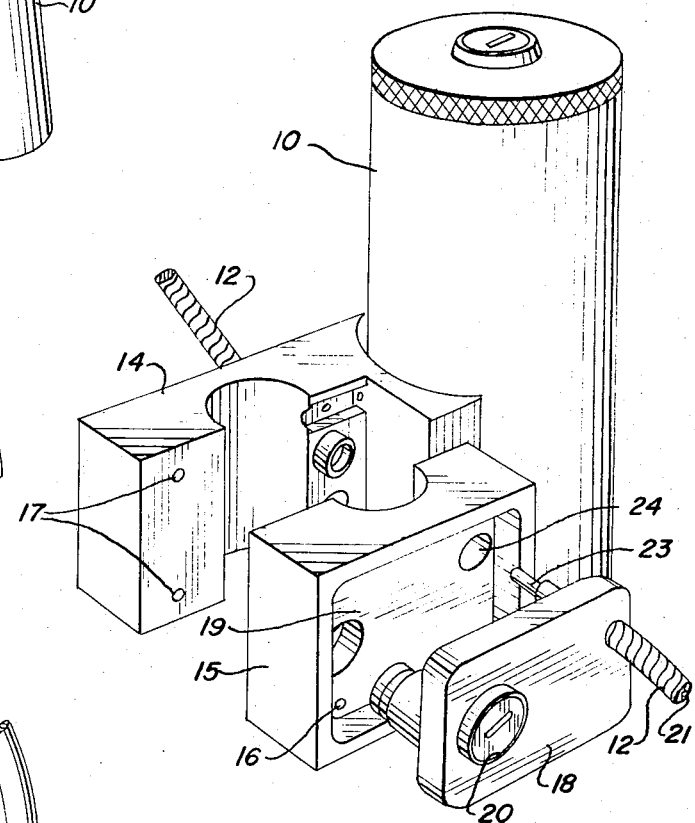
FIG. 2 is an exploded isometric drawing showing the external components of the system.

As shown in FIG. 1 and in detail in FIG. 2, the attachment of the housing 10 to the frame 11 is made by the engagement of locking clamp 14, which is a fixed and integral part of the housing 10, with removable clamp 15 around the vertical seat post of the bicycle frame 11. The removable clamp 15 is attached to the fixed locking clamp 14 by screws which are pushed through openings 16 in the removable clamp 15 and are screwed into coinciding screw receptacles 17 in fixed clamp 14. When engaged, the locking clamps sturdily fix the housing 10 to the frame 11.

One end of the restraining cable 12 is fixed to locking clamp 14 and the other end of the cable is attached to a removable plate 18. The removable plate 18 is constructed to fit into a cut-out slot 19 in locking clamp 15 so as to form a continuous surface therewith. The plate 18 and, consequently, the cable 12 can be locked to the clamp 15 by a lock 20. When the plate 18 is locked into clamp 15, the screws are hidden so that there is no way to remove the device from the vehicle.

Figure 3:
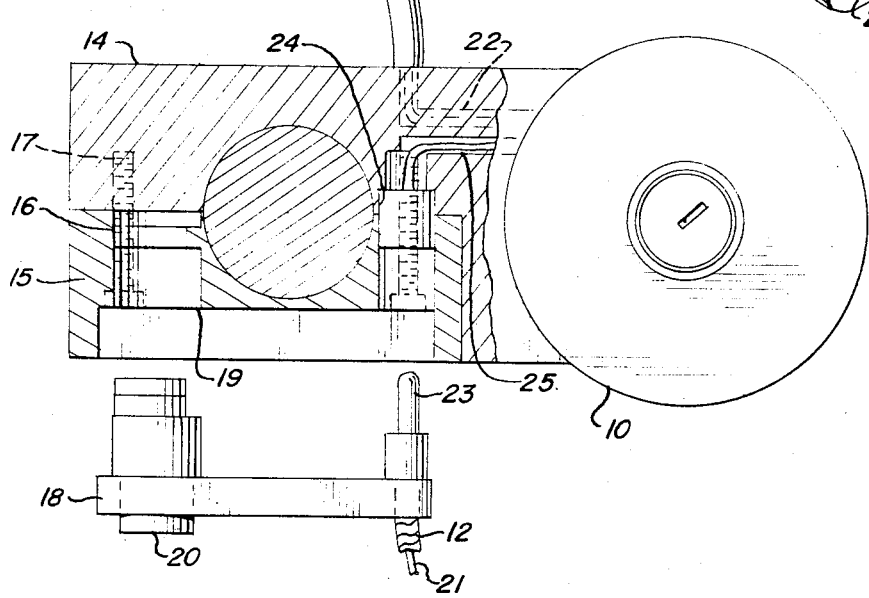
FIG. 3 is a plan view of the external components of the system cut away to shown certain internal components of the device.

In accordance with the present invention and as shown in greater detail in FIG. 3, the armor restraining cable 12 is hollow and contains a sense loop wire 21 within. One end of the sense loop wire 21 runs through the fixed clamp 14 cable connection and through a passage 22 into the housing 10 and is connected to the alarm circuit. At its other end, the sense loop wire 21 is connected to and terminates in a sense loop plug 23 affixed to the removable plate 18. When the plate 18 is placed into the cut-out slot 19 in removable clamp 15, the sense loop plug 23 fits into the sense loop receptacle 24 and completes contact with alarm circuit lead wire 25.

Figure 4:
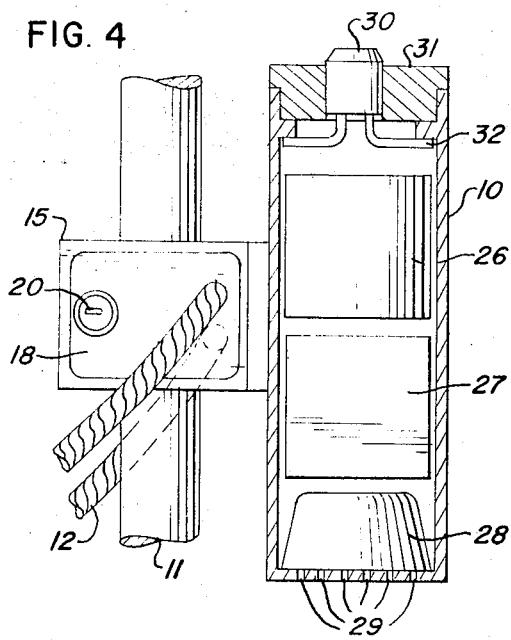
FIG. 4 is a front view of the system cut away to show the components contained within the housing.

FIG. 4 illustrates the housing 10 and the electrical alarm system contained within. Located within the housing is a power unit 26 which provides a source of power for electrical alarm circuit 27. The alarm 27 is connected to warning buzzer 28 which, when detonated by current passing from the alarm circuit, sounds a loud alarm. The housing 10 includes sound holes 29 located at its bottom and positioned immediately below the warning buzzer 28.

An on-off alarm circuit activating switch and alarm case lock 30 is provided at the top of the housing 10. The activating switch and case lock 30 is key operated and has three positions. Position one allows the housing cover 31 to be opened. Position two engages the locking latch 32 for locking the housing cover 31 to the alarm case housing 10, thereby sealing the unit. The third position of activating switch and case lock 30 activates the power unit 26 and, consequently, the alarm circuit 27.

The alarm lock provided in the disclosed embodiment has the following mode of operation. The end of the restraining cable 12 which is attached to the removable plate 18 is passed through the rear wheel of the bicycle and around any stationary object such as a tree, a telephone pole, or a bicycle rack. The removable locking plate 18 is positioned into the cut-out slot 19 provided in locking mechanism 20. The clamp and housing mechanism is constructed so that prying equipment will not be able to remove the alarm lock from the vehicle once the removable locking plate 18 is fastened into place. Locking the removable locking plate 18 into place secures the vehicle to the stationary object because the cable 12 forms a fixed connecting loop around and between the two. At this point, the sense loop wire 21 is connected into the alarm circuit 27. The alarm circuit 27 is then activated by placing switch 30 in its third position.

Positive theft protection is provided by both the armored locking cable which defines a connecting loop between the vehicle and the stationary object and by the alarm system which detonates the warning buzzer 28, if and when the cable 12 and, consequently, the sense loop wire 21 are cut or otherwise interrupted. In the system provided, the warning buzzer will continue to ring, even if the cut ends of the sensing loop wire 21 are rejoined.

Figure 5:
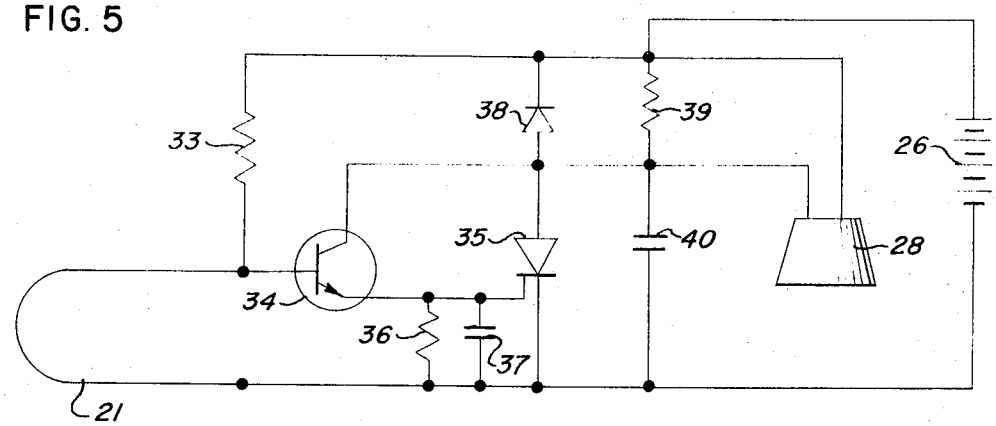
FIG. 5 is a circuit diagram of the alarm circuit of the embodiment described in FIG. 4.
Figure 7:
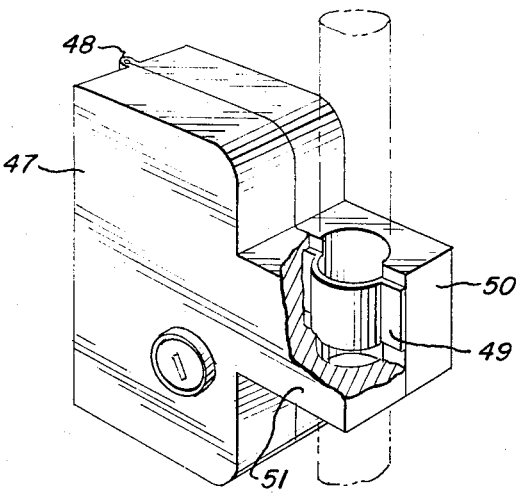
FIG. 7 is a perspective of an alternative housing construction of the present invention.

FIG. 5 illustrates the alarm circuit as completed by connection of the sense loop wire 21. When activated, power unit 26 supplies a small amount of current through resistor 33 and the shunt sense loop 21. When the shunt sense loop 21 is in its continuous and uncut state, the base of the transistor 34 is held at negative battery potential so that the transistor is non-conducting and its emitter holds the gate of the unidirectional conductive silicon controlled rectifier 35 at negative battery potential, thereby holding the energizing circuit for warning buzzer 28 open.

If the cable 12 and, consequently, the shunt sense loop wire 21 are cut or otherwise disengaged, the potential of the base of the transistor 34 goes positive to render the transistor conducting and draws current through the voltage dropping resistor 33 for applying an activating signal to the gate of the S.C.R. 35. The S.C.R. 35 conducts to complete the energizing circuit for the warning buzzer 28 causing it to generate a loud warning signal.

The remaining circuit components resistor 36, capacitor 37, reverse connected 38, resistor 39 and capacitor 40 are conventional for use in this type of circuit and can be replaced by any equivalent means.

Figure 6:
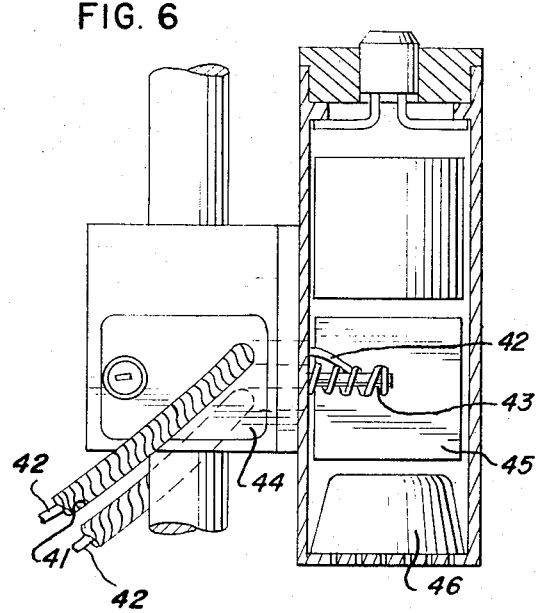
FIG. 6 is a schematic diagram showing the switching mechanism of an alternative embodiment of the invention.

As schematically shown in FIG. 6, the alarm lock of the present invention can also utilize a mechanical switching mechanism. The structure of the unit is otherwise the same as that shown in FIG. 3. In this embodiment, armor restraining cable 41 surrounds a trip wire 42. The trip wire is connected to a spring-loaded snap action electric switch 43 at one end and rigidly affixed to the removable locking plate 44 at the other end. When the cable 41 is fixed into place to secure the vehicle to a stationary object, the alarm circuit is then activated as previously described. Cutting the restraining cable 41 will also cut the trip wire 42 which in turn releases and closes the snap action switch 43 allowing current in alarm circuit 45 to pass into and activate the warning buzzer 46.

FIG. 6 illustrates another embodiment of the present invention wherein the housing 47, itself, is hinged by hinges 48 located at the rear and opens for ease in reaching the internal components. In this embodiment, the unit is attached to the vehicle by screwing removable clamp plate 49 to clamp section 50. When the housing is locked in a closed position clamp section 51 hides the attaching screws and, thereby, provides protection from unauthorized tampering.

Thus, while preferred constructional features of the invention are embodied in the structure illustrated herein, it is to be understood that changes and variations may be made by those skilled in the art.

What is claimed is:

1. An alarm lock system for protecting objects that can be moved from a desired location comprising:
    a housing constructed of force-resistant material;
    clamping means for lockingly attaching said housing to the object including first clamping means fixed to the housing and second clamping means engageable to said first clamping means, said clamping means constructed of a force-resistant material;

electrical alarm circuit means contained within said housing including switching means having first and second states, and warning means for generating a warning signal when said switching means is in its second state; and flexible cable means constructed from force-resistant material having one end unitarily fixed to said housing and its other end attached to a locking plate lockingly engageable in said second clamping means, said locking plate providing a continuous surface with said clamping means when so engaged and preventing access to the connection of said first and second clamping means, said cable means forming a continuous locking loop when said locking plate is engaged in said second clamping means and additionally sheaths a shunt wire means connected in said alarm circuit when said cable means is engaged in said second clamping means, said shunt wire rendering said switch means conductive when said locking loop is severed.

2. An apparatus as in claim 1 wherein said switching means is an electronic switch.

3. An apparatus as in claim 2 wherein said means for changing said switching means to its second state is a shunt wire connected to said alarm circuit when said object restraining and switch activating means is in said locking position.

4. An apparatus as in claim 2 wherein said electronic switch is a unidirectional conductive switch which once in its second state continues to energize said warning means even if said interrupted restraining configuration is rejoined.

5. An apparatus as in claim 1 wherein said switching means is a mechanical switch.

6. An apparatus as in claim 1 wherein said switching means is a snap action switch and said object restraining and switch activating means is a flexible cable sheathing a trip wire fastened at one end to said snap action switch.

* * * * *

UNITED STATES PATENT OFFICE
CERTIFICATE OF CORRECTION

Patent No. 3,781,861  Dated Dec. 25, 1973

Inventor(s) Charles F. Adler, Jr., and Marshall L. Silver

It is certified that error appears in the above-identified patent and that said Letters Patent are hereby corrected as shown below:

Col. 1, line 39: "Enough" should be --enough--;
Col. 2, line 13: "the" should be --The--;
Col. 2, line 17: "is" should be --if--;
Col. 2, line 38: "shown" should be --show--;
Col. 3, line 31: After "alarm" and before "27" the following word should be inserted, --circuit--;
Col. 3, line 59: "securs" should be --secures--.

Signed and sealed this 9th day of April 1974.

(SEAL)
Attest:

EDWARD M. FLETCHER, JR.
Attesting Officer

C. MARSHALL DANN
Commissioner of Patents